US012050414B2

(12) United States Patent
Chiba et al.

(10) Patent No.: US 12,050,414 B2
(45) Date of Patent: Jul. 30, 2024

(54) DEVELOPING DEVICE INCLUDING FILTER DETACHABLE HOLDER, PROCESS CARTRIDGE, AND IMAGE FORMING APPARATUS

(71) Applicants: Yusuke Chiba, Kanagawa (JP); Takuya Suganuma, Kanagawa (JP); Kazuki Yogosawa, Tokyo (JP); Taku Kumiya, Kanagawa (JP); Hotaru Hashikawa, Kanagawa (JP)

(72) Inventors: Yusuke Chiba, Kanagawa (JP); Takuya Suganuma, Kanagawa (JP); Kazuki Yogosawa, Tokyo (JP); Taku Kumiya, Kanagawa (JP); Hotaru Hashikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/992,951

(22) Filed: Nov. 23, 2022

(65) Prior Publication Data

US 2023/0168608 A1 Jun. 1, 2023

(30) Foreign Application Priority Data

Nov. 30, 2021 (JP) ................................ 2021-193924

(51) Int. Cl.
*G03G 15/08* (2006.01)

(52) U.S. Cl.
CPC ..... *G03G 15/0898* (2013.01); *G03G 15/0881* (2013.01)

(58) Field of Classification Search
None
See application file for complete search history.

(56) References Cited

U.S. PATENT DOCUMENTS

| | | | | |
|---|---|---|---|---|
| 4,377,334 A * | 3/1983 | Nishikawa | ......... | G03G 15/0942 399/279 |
| 2014/0169827 A1* | 6/2014 | Hattori | .............. | G03G 15/0865 399/106 |
| 2014/0270838 A1 | 9/2014 | Yoshizawa et al. | | |

(Continued)

FOREIGN PATENT DOCUMENTS

| | | |
|---|---|---|
| JP | 2005-346035 | 12/2005 |
| JP | 2012-189787 | 10/2012 |

(Continued)

OTHER PUBLICATIONS

U.S. Appl. No. 17/830,391, filed Jun. 2, 2022, Shotaro Hoshi, et al.

*Primary Examiner* — Arlene Heredia
(74) *Attorney, Agent, or Firm* — XSENSUS LLP

(57) ABSTRACT

A developing device includes a developing case, a filter, and a filter holder. The developing case stores developer inside to develop a latent image formed on a surface of an image bearer and has an opening portion that communicates between an inside and an outside of the developing device. The filter has a lower weight density per unit volume at a first side of the filter facing the inside of the developing device than a weight density per unit volume at a second side of the filter facing the outside of the developing device. The filter holder is detachably attached to the opening portion of the developing case with the filter held by the filter holder.

11 Claims, 6 Drawing Sheets

(56) References Cited

U.S. PATENT DOCUMENTS

| | | | | |
|---|---|---|---|---|
| 2014/0376951 | A1* | 12/2014 | Ogawa | G03G 15/0898 399/98 |
| 2020/0103824 | A1* | 4/2020 | Oshikawa | G03G 15/0822 |
| 2022/0107605 | A1* | 4/2022 | Hashikawa | B01D 46/56 |
| 2022/0121138 | A1 | 4/2022 | Yamada et al. | |

FOREIGN PATENT DOCUMENTS

| | | |
|---|---|---|
| JP | 2014-119623 | 6/2014 |
| JP | 2014-178347 | 9/2014 |
| JP | 2014-178562 | 9/2014 |
| JP | 2022-061616 | 4/2022 |

* cited by examiner

DEVELOPING DEVICE INCLUDING FILTER DETACHABLE HOLDER, PROCESS CARTRIDGE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-193924, filed on Nov. 30, 2021, in the Japan Patent Office, the entire disclosure of which is hereby incorporated by reference herein.

BACKGROUND

Technical Field

Embodiments of the present disclosure relate to a developing device that stores developer such as two-component developer therein, a process cartridge that includes the developing device, and an image forming apparatus.

Related Art

Some technologies are known that, in a developing device disposed in an image forming apparatus such as a copier or a printer, a filter is disposed in an opening portion in an upper part of a developing case for the purpose of preventing toner scattering due to an increase of the internal pressure in the developing device.

SUMMARY

In an embodiment of the present disclosure, there is provided a developing device that includes a developing case, a filter, and a filter holder. The developing case stores developer inside to develop a latent image formed on a surface of an image bearer and has an opening portion that communicates between an inside and an outside of the developing device. The filter has a lower weight density per unit volume at a first side of the filter facing the inside of the developing device than a weight density per unit volume at a second side of the filter facing the outside of the developing device. The filter holder is detachably attached to the opening portion of the developing case with the filter held by the filter holder.

In another embodiment of the present disclosure, there is provided a process cartridge that includes the developing device and the image bearer integrated with the developing device. The process cartridge is attachable to and detachable from a body of an image forming apparatus.

In still another embodiment of the present disclosure, there is provided an image forming apparatus that includes the developing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
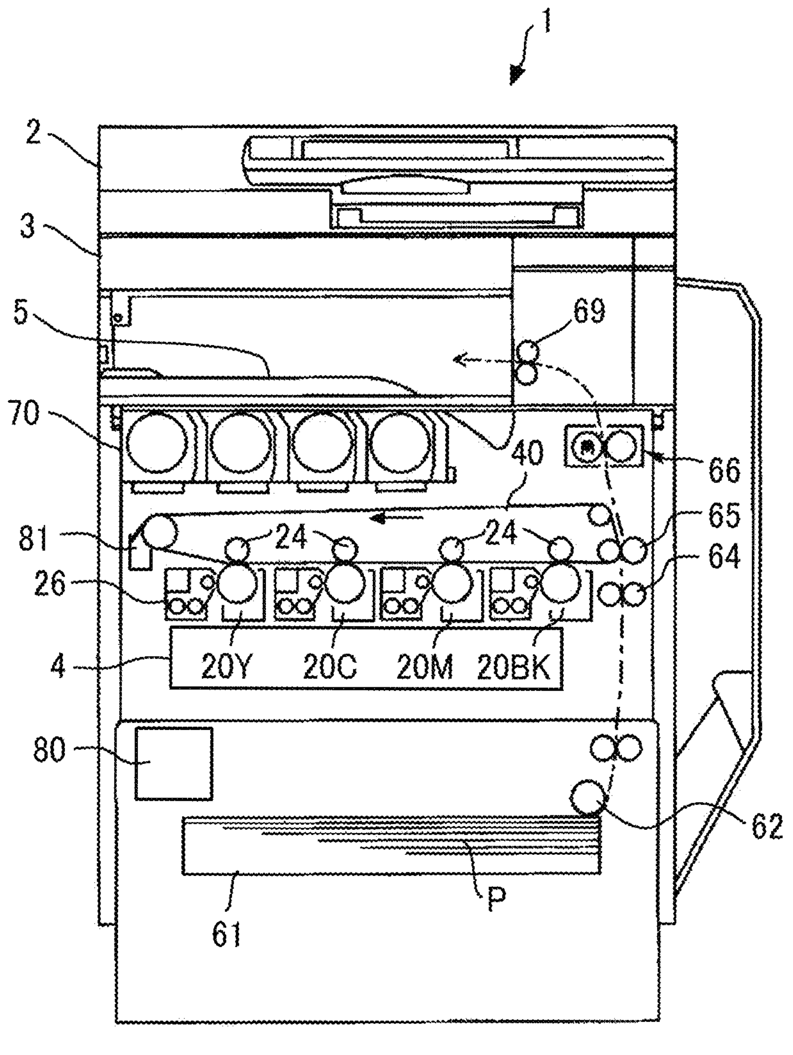
FIG. 1 is a diagram illustrating an overall configuration of an image forming apparatus, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, with reference to FIG. 1, a description is given of an overall configuration and operation of an image forming apparatus 1, according to an embodiment of the present disclosure. The image forming apparatus 1 according to the present embodiment is a tandem-type multicolor image forming apparatus in which process cartridges 20Y, 20M, 20C, and 20BK are arranged in parallel to each other, facing an intermediate transfer belt 40. In each of the process cartridges 20Y, 20M, 20C, and 20BK, a developing device 26 (see FIG. 2) is disposed to face a photoconductor drum 21 serving as an image bearer.

In FIG. 1, the image forming apparatus 1, which is an apparatus body of a color copier in the present embodiment, includes a document conveying device 2, a document reading device 3, and a writing device 4 (exposure device). The document conveying device 2 conveys documents to the document reading device 3. The document reading device 3 scans image data of the documents. The writing device 4 emits a laser beam according to input image data. Yellow, magenta, cyan and black toner images are formed on the surfaces of the photoconductor drums 21 of the process cartridges 20Y, 20M, 20C, and 20BK, respectively. The yellow, magenta, cyan and black toner images on the photoconductor drums 21 are transferred onto the intermediate transfer belt 40 and superimposed. The image forming apparatus 1 further includes a sheet feeder 61, a secondary transfer roller 65, and a fixing device 66. The sheet feeder 61 stores sheets P such as paper sheets. The secondary transfer roller 65 transfers the toner images formed on the intermediate transfer belt 40 onto the sheet P. The fixing device 66 fixes an unfixed toner image on the sheet P. The image forming apparatus 1 still further includes toner containers 70, cleaning devices 23, an intermediate-transfer-belt cleaner 81, and a waste-toner container 80. The toner containers 70 supply toner of the four colors to the respective developing devices 26 of the process cartridges 20Y, 20M, 20C, and 20BK. The waste-toner container 80 collects the toner collected by the cleaning devices 23 (see FIG. 2) and untransferred toner collected by the intermediate-transfer-belt cleaner 81.

Figure 2:
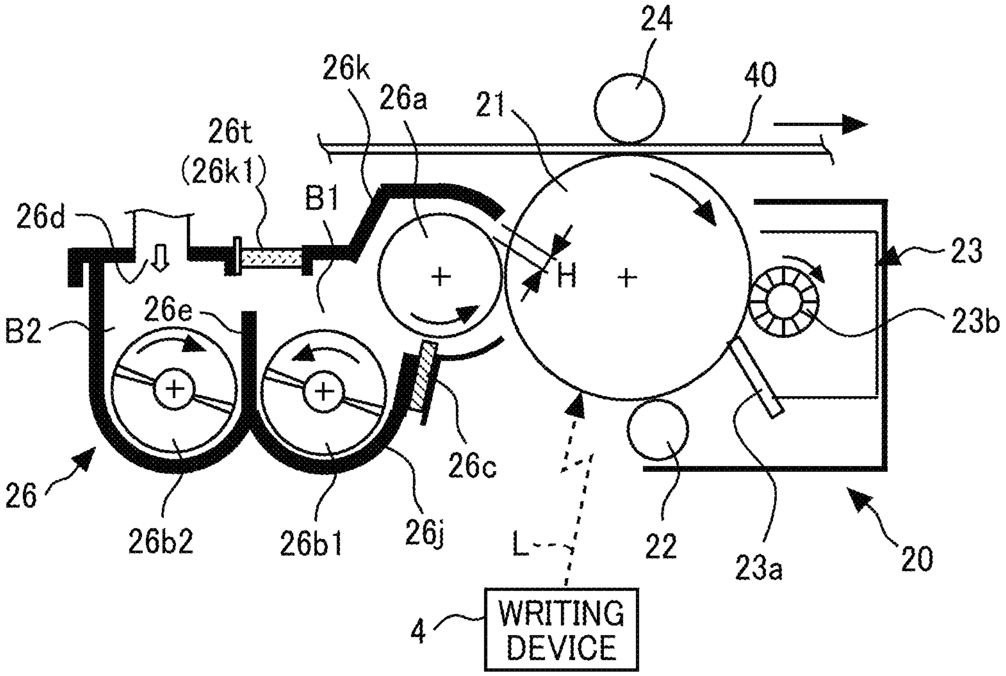
FIG. 2 is a cross-sectional view of an image forming device of the image forming apparatus of FIG. 1.

Each of the process cartridges 20Y, 20M, 20C, and 20BK includes the photoconductor drum 21 as an image bearer, a charging device 22, and the cleaning device 23, which are united as a single unit as illustrated in FIG. 2. Each of the process cartridges 20Y, 20M, 20C, and 20BK, which is expendable, is removed from a body of an image forming apparatus 1 and replaced with a new one when depleted in the body of the image forming apparatus 1. The developing device 26 is disposed to face the photoconductor drum 21 in each of the process cartridges 20Y, 20M, 20C, and 20BK. Each of the developing devices 26, which is expendable, is removed from the body of the image forming apparatus 1 and replaced with a new one when depleted in the body of the image forming apparatus 1. An operator may independently perform an attachment and detachment operation of the developing device 26 with respect to the body of the image forming apparatus 1, and an attachment and detachment operation of the process cartridges 20Y, 20M, 20C, and 20BK with respect to the body of the image forming apparatus 1, as different operations. In the process cartridges 20Y, 20M, 20C, and 20BK, the yellow, magenta, cyan, and black toner images are formed on the respective photoconductor drums 21 as the image bearers.

A description is given below of operations of the image forming apparatus 1 to form a normal color toner image. A conveying roller of the document conveying device 2 conveys a document from a document table onto an exposure glass of the document reading device 3. The document reading device 3 optically scans image data for the document on the exposure glass. The yellow, magenta, cyan, and black image data are transmitted to the writing device 4. The writing device 4 irradiates the surface of the photoconductor drums 21 (see FIG. 2) of the process cartridges 20Y, 20M, 20C, and 20BK with laser beams (as exposure light) L according to the yellow, magenta, cyan, and black image data, respectively.

Meanwhile, the four photoconductor drums 21 rotate clockwise as illustrated in FIGS. 1 and 2. The surface of the photoconductor drum 21 is uniformly charged at a position opposite the charging device 22 (a charging roller) (in a charging process). Thus, the surface of the photoconductor drum 21 is charged to a charging potential. When the charged surface of the photoconductor drum 21 reaches a position to receive the laser beam L emitted from the writing device 4, an electrostatic latent image is formed at the position on the surface of the photoconductor drum 21 according to the image data (in an exposure process).

The laser beam L corresponding to yellow image data is emitted to the surface of photoconductor drum 21 in the process cartridge 20Y, which is the first from the left in FIG. 1 among the four process cartridges 20Y, 20M, 20C, and 20BK. A polygon mirror that rotates at high velocity directs the laser beam L for the yellow image data to the surface of the photoconductor drum 21 along an axial direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to cyan image data is emitted to the surface of the photoconductor drum 21 in the second process cartridge 20C from the left in FIG. 1, thus forming an electrostatic latent image corresponding to the cyan image data on the surface of the photoconductor drum 21. The laser beam L corresponding to magenta image data is emitted to the surface of the photoconductor drum 21 in the third process cartridge 20M from the left in FIG. 1, thus forming an electrostatic latent image corresponding to the magenta image data on the surface of the photoconductor drum 21. The laser beam L corresponding to black image data is emitted to the surface of the photoconductor drum 21 in the fourth process cartridge 20BK from the left in FIG. 1, thus forming an electrostatic latent image corresponding to the black image data on the surface of the photoconductor drum 21.

Then, the surface of the photoconductor drum 21 bearing the electrostatic latent image for each color reaches a position opposite the developing device 26. The developing device 26 supplies toner onto the surface of the photoconductor drum 21 and develops the electrostatic latent image on the photoconductor drum 21 into a toner image (in a development process). After the development process, the surface of the photoconductor drum 21 reaches a position opposite the intermediate transfer belt 40. Each of primary transfer rollers 24 is disposed at the position where the surface of the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon (in a primary transfer process).

After the primary transfer process, the surface of the photoconductor drum 21 reaches a position opposite the cleaning device 23. The cleaning device 23 collects the untransferred toner remaining on the photoconductor drum 21 (in a cleaning process). The untransferred toner collected in the cleaning device 23 passes through a waste-toner conveyance tube and is collected as waste toner in the waste-toner container 80. Subsequently, a residual potential of the surface of the photoconductor drum 21 is removed at a position opposite a discharging device. Thus, a series of image forming processes performed on the photoconductor drum 21 is completed.

Meanwhile, the surface of the intermediate transfer belt 40, onto which the single-color toner images on the photoconductor drums 21 are transferred and superimposed, moves in a direction indicated by an arrow in FIG. 1 and reaches a position opposite the secondary transfer roller 65. The secondary transfer roller 65 secondarily transfers the multicolor toner image on the intermediate transfer belt 40 onto the sheet P (in a secondary transfer process). After the secondary transfer process, the surface of the intermediate transfer belt 40 reaches a position opposite the intermediate-transfer-belt cleaner 81. The intermediate-transfer-belt cleaner 81 collects the untransferred toner on the intermediate transfer belt 40 to complete a series of transfer processes on the intermediate transfer belt 40. The untransferred toner collected in the intermediate-transfer-belt cleaner 81 passes through the waste-toner conveyance tube and is collected as waste toner in the waste-toner container 80.

The sheet P is conveyed from the sheet feeder 61 to the position of the secondary transfer roller 65 via a registration roller pair 64. Specifically, a feed roller 62 feeds the sheet P from the top of multiple sheets P stored in the sheet feeder 61. The sheet P is conveyed to the registration roller pair 64 through a sheet conveyance passage. The sheet P that has reached the registration roller pair 64 is conveyed toward the position of the secondary transfer roller 65 so that the sheet P coincides with the arrival of the multicolor toner image on the intermediate transfer belt 40.

Subsequently, the sheet P, onto which the multicolor image is transferred, is conveyed to a fixing device 66. The fixing device 66 includes a fixing roller and a pressure roller pressing against each other. In a nip between the fixing roller and the pressure roller, the multicolor toner image is fixed on the sheet P. After the fixing process, an output roller pair 69 ejects the sheet P as an output image outside the body of the image forming apparatus 1. The ejected sheets P are stacked on an output tray 5. Thus, a series of image forming processes is completed.

Next, with reference to FIGS. 2 and 3, image forming devices of the image forming apparatus, according to an embodiment of the present disclosure are described in detail below. The four image forming devices disposed in the body of the image forming apparatus 1 (see FIG. 1) have a similar configuration except the colors of the toner used in the image forming processes. Thus, parts of the image forming device such as the process cartridge and the developing device are illustrated without suffixes Y, M, C, and BK, which denote the colors of the toner, in the drawings.

As illustrated in FIG. 2, the process cartridge 20 mainly includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is a charging roller including a conductive core and an elastic layer of moderate resistivity overlaid on the outer circumference of the conductive core. A power supply applies a specified voltage to the charging device 22 that is the charging roller, and the charging device 22 uniformly charges the surface of the photoconductor drum 21 opposite the charging device 22. The cleaning device 23 includes a cleaning blade **25*a* and a cleaning roller 25*b* that contact the photoconductor drum 21. For example, the cleaning blade 25*a* is made of rubber, such as urethane rubber, and contacts the surface of the photoconductor drum 21 at a specified angle with a specified pressure. The cleaning roller 25*b*** is a brush roller in which brush bristles are provided around a core.

Figure 3:
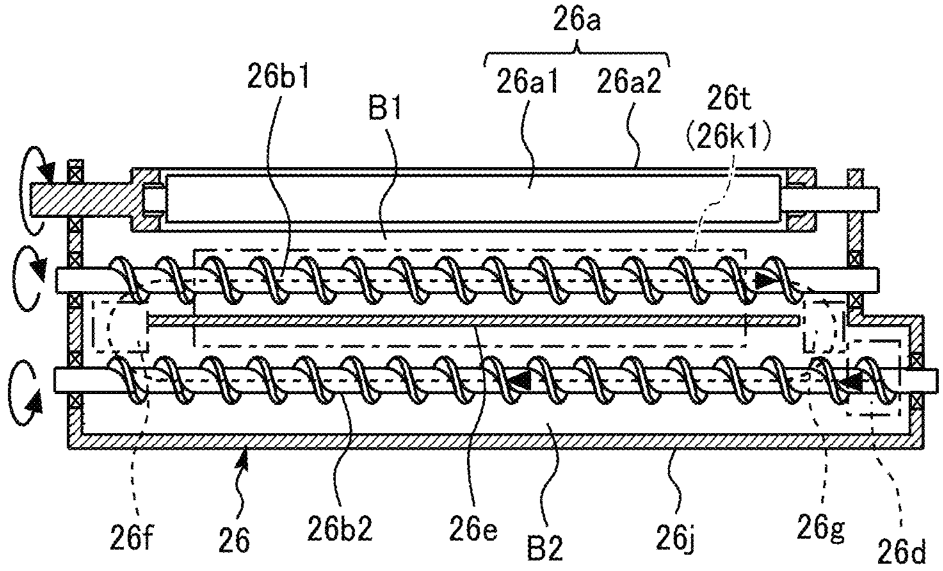
FIG. 3 is a schematic view of a developing device in a longitudinal direction included in the image forming apparatus of FIG. 1.

As illustrated in FIGS. 2 and 3, the developing device 26 mainly includes a developing roller **26*a* as a developer bearer, a first conveying screw 26*b*1 as a first conveyor facing the developing roller 26*a*, a partition 26*e*, a second conveying screw 26*b*2 as a second conveyor facing the first conveying screw 26*b*1 via the partition 26*e*, and a doctor blade 26*c* as a developer regulator facing the developing roller 26*a* to regulate an amount of developer borne on the developing roller 26*a*. The developing device 26 in the present embodiment includes a filter 26*t* and a filter holder 26*s*. A description of the filter 26*t* and the filter holder 26*s*** is given in detail below.

The developing device 26 stores two-component developer including carrier and toner. The developing roller **26*a* faces the photoconductor drum 21 with a small gap, thereby forming a developing area. As illustrated in FIG. 3, the developing roller 26*a* includes a magnet 26*a*1 secured inside and a sleeve 26*a*2 that rotates around the magnet 26*a*1. The magnet 26*a*1 generates multiple poles (magnetic poles) around an outer circumferential surface of the developing roller 26*a***.

The first conveying screw **26*b*1 and the second conveying screw 26*b*2 as conveyors convey the developer stored in the developing device 26 in a longitudinal direction of the developing device 26, thereby establishing a circulation passage indicated by the dashed arrow in FIG. 3. In other words, the first conveying screw 26*b*1 establishes a first conveyance passage B1, whereas the second conveying screw 26*b*2 establishes a second conveyance passage B2. The circulation passage of the developer includes the first conveyance passage B1 and the second conveyance passage B2. The partition 26*e* is an inner wall and separates the first conveyance passage B1 from the second conveyance passage B2. The first conveyance passage B1 and the second conveyance passage B2 communicate with each other via a first communication opening 26*f* and a second communication opening 26*g* disposed at both longitudinal ends of the first conveyance passage B1 and the second conveyance passage B2. Specifically, with reference to FIG. 3, in a conveyance direction of the developer, an upstream end of the first conveyance passage B1 communicates with a downstream end of the second conveyance passage B2 via the first communication opening 26*f*. On the other hand, in the conveyance direction of the developer, a downstream end of the first conveyance passage B1 communicates with an upstream end of the second conveyance passage B2 via the second communication opening 26*g*. That is, the partition 26*e* is disposed along the circulation passage except both longitudinal ends of the circulation passage. The first conveying screw 26*b*1 (or the first conveyance passage B1) is disposed facing the developing roller 26*a*. The second conveying screw 26*b*2 (or the second conveyance passage B2) is disposed facing the first conveying screw 26*b*1 (or the first conveyance passage B1) via the partition 26*e*. The first conveying screw 26*b*1 supplies developer toward the developing roller 26*a* and collects the developer separated from the developing roller 26*a* after the development process while conveying the developer in the longitudinal direction of the developing device 26. The second conveying screw 26*b*2 stirs and mixes the developer after the development process conveyed from the first conveyance passage B1 with fresh toner supplied from a toner supply inlet 26*d* while conveying the developer and the fresh toner in the longitudinal direction of the developing device 26. In the present embodiment, the two conveying screws (i.e., the first conveying screw 26*b*1 and the second conveying screw 26*b*2) are horizontally arranged in parallel. Each of the two conveying screws (i.e., the first conveying screw 26*b*1 and the second conveying screw 26*b*2**) includes a shaft and a screw blade wound around the shaft.

In the present embodiment, the developing device 26 includes two developing cases (i.e., an upper developing case **26*k* and a lower developing case 26*j*) that can be divided into upper and lower parts as a housing, and is covered by the two developing cases. The developing roller 26*a*, the first conveying screw 26*b*1, and the second conveying screw 26*b*2 are rotatably held in the lower developing case 26*j*. The doctor blade 26*c* is also held in the lower developing case 26*j*. In the upper developing case 26*k*, the filter holder 26*s* that holds the filter 26*t* is disposed in an opening portion 26*k*1 as described later. The upper developing case 26*k* is detachably attached to the lower developing case 26*j* in which the developing roller 26*a*, the first conveying screw 26*b*1, the second conveying screw 26*b*2, and the doctor blade 26*c*** are disposed, with fastening screws or snap-fastening.

With reference to FIGS. 2 and 3, a description is given in further detail of the image forming processes described above, focusing on the development process. The developing roller **26*a* rotates in a direction indicated by an arrow in FIG. 2. As illustrated in FIGS. 2 and 3, the first conveying screw 26*b*1 and the second conveying screw 26*b*2 are disposed facing each other with the partition 26*e* interposed therebetween and rotate in directions indicated by arrows in FIGS. 2 and 3. Toner is supplied from the toner container 70 to the toner supply inlet 26*d* through a toner supply passage. As the first conveying screw 26*b*1 and the second conveying screw 26*b*2 rotate in the respective directions in FIG. 2, the developer stored in the developing device 26 circulates together with the supplied toner in the longitudinal direction of the developing device 26 (i.e., the direction indicated by the dashed arrow in FIG. 3) while being stirred and mixed with the supplied toner. The toner is charged by friction with carrier in the developer and electrostatically attracted to the carrier. Then, the toner is scooped up on the developing roller 26*a* together with the carrier by a developer scooping pole generated on the developing roller 26*a*. The developer borne on the developing roller 26*a* is conveyed in the counterclockwise direction indicated by the arrow in FIG. 2 to a position opposite the doctor blade 26*c*. The doctor blade 26*c* adjusts the amount of the developer on the developing roller 26*a* to a proper amount at the position. Subsequently, the rotation of the sleeve 26*a*2 of the developing roller 26*a* conveys the developer to the developing area in which the developing roller 26*a* faces the photoconductor drum 21. The toner in the developer is attracted to the electrostatic latent image formed on the photoconductor drum 21 due to the effect of an electric field generated in the developing area. As the sleeve 26*a*2 rotates, the developer remaining on the developing roller 26*a* reaches above the first conveyance passage B1 and is separated from the developing roller 26*a*. The electric field in the developing area is generated by a specified voltage (in other words, a development bias) applied to the developing roller 26*a* by a development power supply and a surface potential (in other words, a latent image potential) formed on the surface of the photoconductor drum 21** in the charging process and the exposure process.

The toner in the toner container 70 is supplied as appropriate through the toner supply passage to the developing device 26 via the toner supply inlet **26*d* as the toner in the developing device 26 is consumed. The toner consumption in the developing device 26 is detected by a toner concentration sensor that magnetically detects a toner concentration in the developer (i.e., the proportion of the toner in the developer) in the developing device 26. The toner supply inlet 26*d* is disposed above an end of the second conveying screw 26*b*2 (or the second conveyance passage B2) in a longitudinal direction of the second conveying screw 26*b*2 (i.e., a lateral direction in FIG. 3**).

Figure 4A:
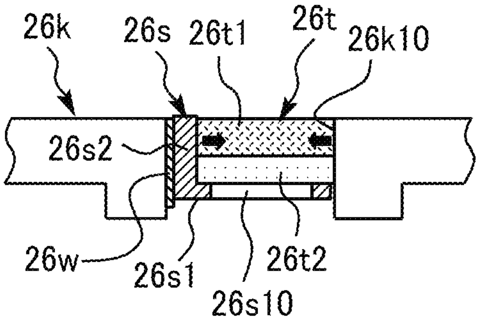
FIG. 4A is an enlarged cross-sectional view of a filter disposed in an opening portion of the developing device together with a filter holder.

The configuration and operation of the developing device 26 according to the present embodiment are described in detail below. With reference to FIGS. 2 and 4A, in the developing device 26 in the present embodiment, the filter holder **26*s* holding the filter 26*t* is disposed in an opening portion 26*k*1 as a communication port between the inside and the outside of the developing device 26. Specifically, the opening portion 26*k*1 (vent) through which air passes from the inside to the outside of the developing device 26 is formed on the ceiling of the upper developing case 26*k* (housing) as a developing case of the developing device 26. The filter 26*t* (and the filter holder 26*s*) is disposed to close the opening portion 26*k*1. The filter 26*t* collects toner as powder and ventilates the developing device 26. In other words, the opening portion 26*k*1 (vent) through which air passes from the inside to the outside of the developing device 26 is formed in the upper developing case 26*k*. The filter 26*t* (and the filter holder 26*s*) is disposed with the opening portion 26*k*1 as a mounting portion. The filter 26*t* is a screen having a mesh size smaller than the particle diameters of toner T and carrier C and thus allows only air to pass through. In the present embodiment, the opening portion 26*k*1 is opened in a substantially rectangular shape, and the filter 26*t* (in a state of a single body) is formed in a substantially rectangular parallelepiped shape. In the present embodiment, the filter 26*t* is held by the filter holder 26*s* in a manner such that the filter 26*t* is attachable to and detachable from the filter holder 26*s***, which is described in detail below.

With reference to FIG. 2, a casing gap H between the developing roller **26*a* and the upper developing case 26*k* downstream from the development area is set to be within a range of 0.6 to 1.0 mm. Note that, if the casing gap H is smaller than 0.6 mm, the developer borne on the developing roller 26*a* after the development process is not smoothly conveyed through the casing gap H between the developing roller 26*a* and the upper developing case 26*k*. Accordingly, the developer is likely to leak to the outside of the developing device 26. On the other hand, if the casing gap H is larger than 1.0 mm, the developer borne on the developing roller 26*a* is not likely to be in sliding contact with an inner circumferential surface of the upper developing case 26*k*, a suction airflow toward the inside of the developing device 26 due to a pump action is not likely to be generated. As a result, the toner is likely to scatter from the developing device 26 (i.e., toner is likely to scatter to the vicinity of the development area). The casing gap H kept within an appropriate range reduces leakage of the developer and prevents the toner from scattering. The internal pressure of the developing device 26 is likely to increase due to the suction airflow through the casing gap H described above. If the internal pressure increases, the toner may scatter from clearance of the developing device 26. To address such a situation, in the present embodiment, the developing case 26*k* has the opening portion 26*k*1 provided with the filter 26*t* to ventilate only air while collecting the toner and preventing the toner from scattering to the outside. Accordingly, the increase of the internal pressure of the developing device 26 is reduced. In other words, this configuration prevents toner scattering caused by the increase of the internal pressure of the developing device 26**.

In the present embodiment, the filter 26*t* has a lower weight density per unit volume at a first side (lower side in FIGS. 2 and 4A) of the filter 26*t* than a weight density per unit volume at a second side (upper side in FIG. 4A) of the filter 26*t*. The first side of the filter 26*t* faces the inside of the developing device 26, and the second side of the filter 26*t* faces the outside of the developing device 26. In other words, the filter 26*t* has an uneven weight density per unit volume. The filter 26*t* has a portion having a relatively low weight density and a portion having a relatively high weight density in a ventilation direction (i.e., a direction in which air flows from the inside of the developing device 26 to the outside of the developing device 26, which is a communication direction). In other words, the filter 26*t* has a gradient of the weight density per unit volume. Note that the state in which the filter 26*t* has a gradient in weight density does not change regardless of whether the filter 26*t* is not disposed in the opening portion 26*k*1 in a single state (i.e., a single state on which an external force does not act) or the filter 26*t* is disposed in the opening portion 26*k*1 (see FIG. 4A).

Figure 5A:
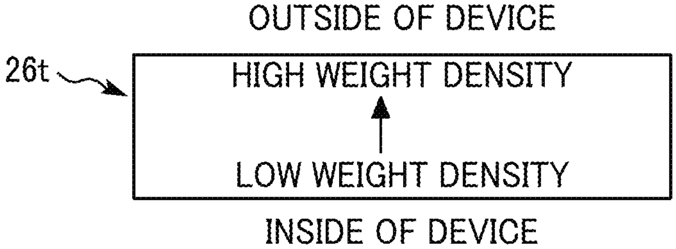
FIG. 5A is a cross-sectional view of a filter having a single-layer structure according to another embodiment.
Figure 5B:
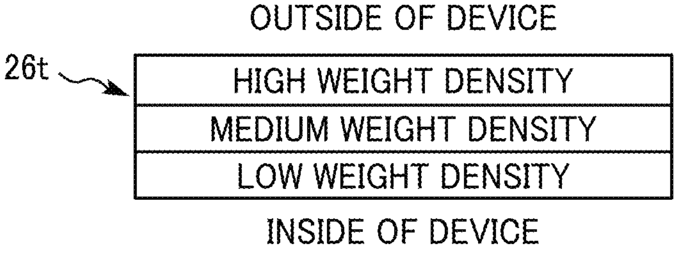
FIG. 5B is a cross-sectional view of a filter having a multiple-layer structure according to another embodiment.

More specifically, in the present embodiment, the filter 26*t* has a two-layer structure, in a single state in which the filter 261 is not disposed in the opening portion 26*k*1, including a low-density portion 26*t*2 having a relatively low weight density per unit volume at the first side and a high-density portion 26*t*1 having a relatively high weight density per unit volume at the second side as illustrated in FIGS. 4A, 5A, and 5B. That is, the low-density portion 26*t*2 at the first side (i.e., upstream side in the ventilation direction) of the filter 26*t* has coarse meshes and is relatively fluffy, while the high-density portion 26*t*1 at the second side (i.e., downstream side in the ventilation direction) of the filter 26*t* has meshes in a clogged state. Accordingly, according to the present embodiment, a toner collecting ability of the high-density portion 26*t*1 of the filter 26*t* is higher than a toner collecting ability of the low-density portion 26*t*2 of the filter 26*t*.

With such a configuration, the filter 26*t* is formed in a manner such that the weight density increases in the ventilation direction (communication direction), thus facilitating formation of the air flow from the inside to the outside of the developing device 26. Accordingly, the increase of the internal pressure in the developing device 26 is efficiently prevented. The overall toner collection property of the filter 26*t* is enhanced while the filter 26*t* is less likely to be clogged.

In the present embodiment, as the filter 26*t*, a filter having a two-layer structure including the high-density portion 26*t*1 and the low-density portion 26*t*2 is used. On the other hand, as illustrated in FIG. 5A, a filter 26*t* having a single-layer structure can be used. In the single-layer structure, the weight density per unit volume of the filter 26*t* gradually increases in the direction of the arrow in FIG. 5A from the first side (facing the inside of the developing device 26) to the second side (facing the outside of the developing device 26). In short, the filter 26*t* has a weight density per unit volume gradually increasing along the ventilation direction, which may be referred to as an exhaust direction. Specifically, the filter 26*t* illustrated in FIG. 5A is coarse and relatively fluffy at the first side, from which the filter 26*t* is gradually more clogged toward the second side. Alternatively, as illustrated in FIG. 5B, a filter 26*t* having a multiple-layer structure (of three layers or more) can be used. In the multiple-layer structure, the weight density per unit volume of the filter 26*t* gradually increases from the first side (facing the inside of the developing device 26) to the second side (facing the outside of the developing device 26). In such a filter 26*t*, a plurality of layers is formed in a manner such that the weight density per unit volume gradually increases along the ventilation direction (exhaust direction). Specifically, the filter 26*t* illustrated in FIG. 5B has a coarse mesh and is in a relatively fluffy state at the first side, from which the filter 26*t* is laminated with a layer gradually more clogged toward the second side.

Figure 6A:
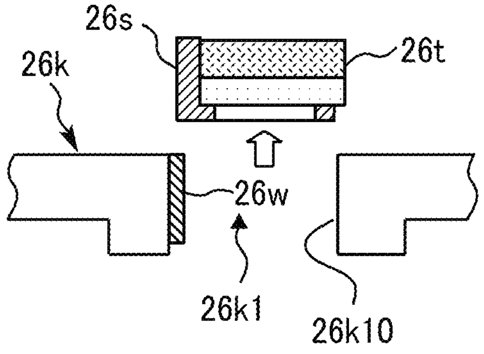
FIG. 6A is a diagram illustrating a state in which the filter of FIG. 4A is removed from the developing device together with the filter holder.
Figure 7A:
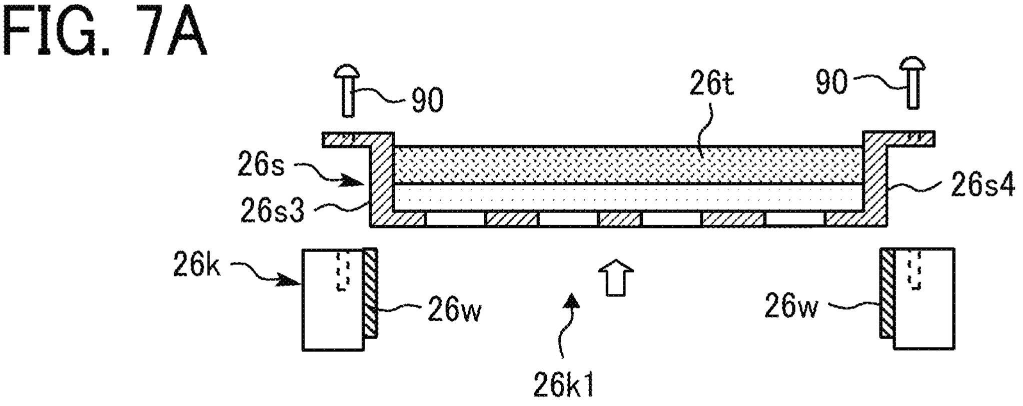
FIG. 7A is a diagram illustrating a state in which the filter of FIG. 6A is removed from the developing device together with the filter holder.
Figure 7B:
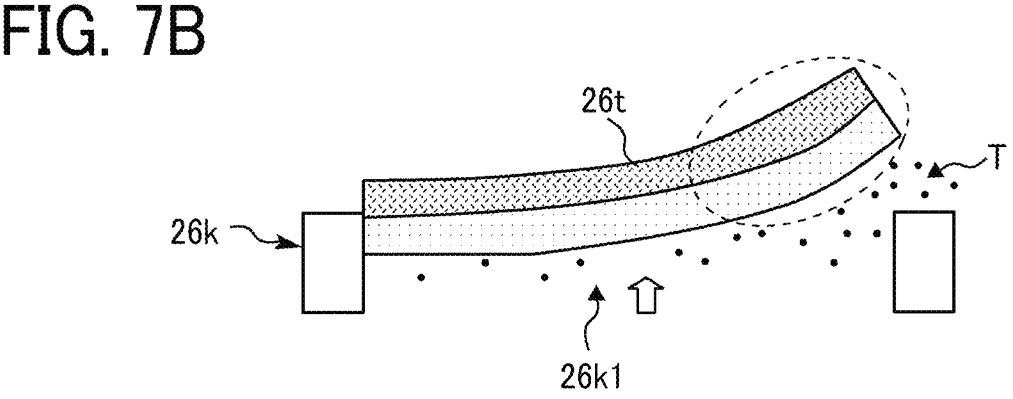
FIG. 7B is a diagram illustrating a state in which the filter of FIG. 6A is independently removed from the developing device as a comparative example.

As illustrated in FIGS. 4A and 6A, the developing device 26 according to the present embodiment includes a filter holder 26*s*. The filter holder 26*s* holding the filter 26*t* is disposed in the opening portion 26*k*1 of the upper developing case 26*k* (developing case). As illustrated in FIGS. 6A and 7A, the filter holder 26*s* according to the present embodiment is attachable to and detachable from the upper developing case 26*k* (developing case) with the filter 26*t* held by the filter holder 26*s*. That is, the filter 26*t* is not attached to or detached from the upper developing case 26*k* as a single body as illustrated in FIG. 7B. The filter 26*t* integrated with the filter holder 26*s* is detached from the upper developing case 26*k* in a direction indicated by a white arrow as illustrated in FIGS. 6A and 7A or is attached to the upper developing case 26*k* in an opposite direction to the direction indicated by the white arrow in FIGS. 6A and 7A.

Figure 4B:
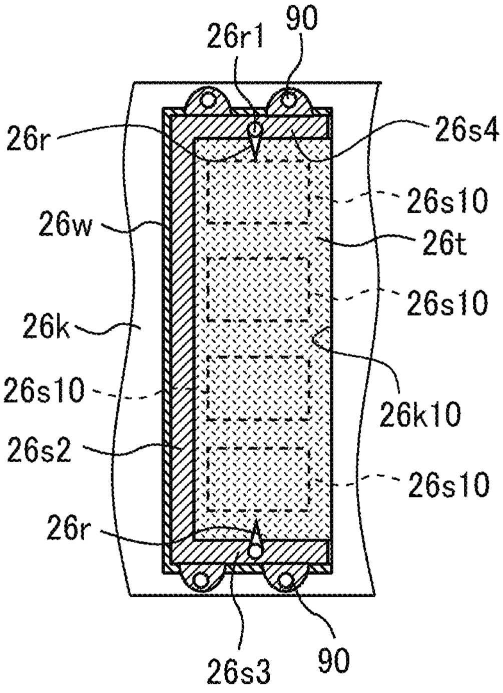
FIG. 4B is an enlarged top view of the filter disposed in the opening portion of the developing device together with the filter holder.

Specifically, as illustrated in FIGS. 4A and 4B, the filter holder 26*s* is a substantially box-shaped member having a bottom 26*s*1 and three sidewalls 26*s*2, 26*s*3, and 26*s*4, and is formed of a resin material. The filter holder 26*s* has a substantially L-shape when viewed in a cross section orthogonal to a longitudinal direction as illustrated in FIG. 4A and has the sidewalls 26*s*2 to 26*s*4 having a substantially U-shape when viewed from above as illustrated in FIG. 4B.

The bottom 26*s*1 of the filter holder 26*s* is located inside the developing device 26 (lower side in FIG. 4A) and is formed in a rectangular parallelepiped shape (rectangular-plate shape). A plurality of through-holes 26*s*10 for ventilation from the inside of the developing device 26 to the filter 26*t* are formed in the bottom 26*s*1. Note that the bottom 26*s*1 may have a single through-hole 26*s*10 as long as the bottom 26*s*1 can hold the filter 26*t* and can also ventilate the filter 26*t* from the inside of the developing device 26. Each of the three sidewalls 26*s*2 to 26*s*4 of the filter holder 26*s* stands from three sides among the four sides of the bottom 26*s*1 toward the outside of the developing device 26 (upward in FIG. 4A). On the other hand, as illustrated in FIGS. 4 and 6A, the upper developing case 26*k* (developing case) has an opposing wall 26*k*10 that faces the one sidewall 26*s*2 (i.e., a sidewall extending in the longitudinal direction) of the three sidewalls 26*s*2 to 26*s*4 of the filter holder 26*s*. The opposing wall 26*k*10 functions as a part of an edge of the opening portion 26*k*1. The filter holder 26*s* is disposed to face the developing roller 26*a* via the opposing wall 26*k*10.

The filter 26*t* is held and compressed by the three sidewalls 26*s*2 to 26*s*4 of the filter holder 26*s* and the opposing wall 26*k*10 (i.e., a part of the edge of the opening portion 26*k*1) of the upper developing case 26*k*. That is, the filter 26*t* attached to the opening portion 26*k*1 is compressed from four directions (directions intersecting with the communication direction, see black arrows in FIG. 4A) by the three sidewalls 26*s*2 to 26*s*4 and the opposing wall 26*k*10. In other words, the filter 26*t* is disposed in the opening portion 26*k*1 in a compressed state from a single state. Such a configuration can prevent air (discharge object) in the developing device 26 from leaking together with toner (collection object) from lateral sides of the filter 26*t* (i.e., only air can be discharged). Accordingly, the function of the filter 26*t* described above can be fully performed, thus reduce scattering of the toner (collection object) to the outside of the developing device 26.

As illustrated in FIGS. 4A and 4B, a seal 26*w* that seals the clearance between the opening portion 26*kl* and the three sidewalls 26*s*2 to 26*s*4 of the filter holder 26*s* is attached to the upper developing case 26*k* (developing case). Specifically, the seal 26*w* is made of an elastic material such as foamed polyurethane, is a substantially U-shaped member when viewed from above as illustrated in FIG. 4B, and is adhered to the opening portion 26*k*1 of the upper developing case 26*k* via a double-sided tape. The seal 26*w* disposed in this manner can prevent the air (discharge object) in the developing device 26 from leaking together with the toner (collection object) from the clearance between the filter holder 26*s* and the opening portion 26*kl*. Accordingly, the function of the filter 261 described above can be fully performed, thus reduce scattering of the toner (collection object) to the outside of the developing device 26.

Since the opposing wall 26*k*10 and the filter 261 are in close contact with each other, air does not leak from the contacting portion together with toner. Ends of the seal 26*w* enter the clearances between the end faces of the sidewalls 26*s*3 and 26*s*4 extending in the lateral direction and the opposing wall 26*k*10 in a flat state. Thus, air is less likely to leak together with the toner from the clearances. Alternatively, seals (which may be part of the seal 26*w*) that actively seal the clearances between the end surfaces of the sidewalls 26*s*3 and 26*s*4 extending in the lateral direction and the opposing wall 26*k*10 can be also disposed.

As described above, the filter holder 26*s* of the developing device 26 according to the present embodiment is attachable to and detachable from the upper developing case 26*k* with the filter 26*t* held by the filter holder 26*s*. As a result, when the filter 26*t* is removed from the developing device 26 for the purpose of maintenance, the above-described configuration can reduce scattering of the toner T collected on the filter 26*t*. Specifically, as illustrated in FIG. 7B as a comparative example, in a case where the filter 26*t* is detached from the developing device 26 as a single body, the filter 26*t* which is long in the longitudinal direction deforms into a curved state. Consequently, the toner T collected on the filter 26*t* is pushed out and scattered, and may contaminate the surroundings. In contrast, in the present embodiment, the filter 26*t* is removed from the developing device 26 in a state where the filter 26*t* is held by the filter holder 26*s* and is not deformed. Such a configuration can reduce scattering of the toner T collected on the filter 261 and contamination of the surroundings. In particular, since the filter 26*t* in the present embodiment has a gradient of the weight density and the toner collection property is enhanced as described above, the configuration of the present disclosure is useful.

In the present embodiment, the filter holder 26*s* is not provided with four sidewalls, but is provided with three sidewalls 26*s*2 to 26*s*4 without one sidewall. The bottom 26*s*1 has an area in which the filter 26*t* can be sufficiently held. As a result, when the filter 26*t* is attached to or detached from the developing device 26 together with the filter holder 26*s* the filter 26*t* is less likely to accidentally detach from the filter holder 26*s*.

Figure 6B:
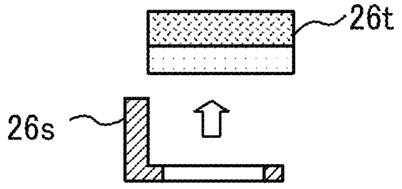
FIG. 6B is a diagram illustrating a state in which the filter of FIG. 6A is removed from the filter holder.

As illustrated in FIG. 6B, the filter 26*t* in the present embodiment is detachably (replaceably) attached to the filter holder 26*s*. As a result, maintenance such as replacement or cleaning of the filter 261 can be easily performed. Specifically, as illustrated in FIG. 6B, the filter 26*t* is attached to and detached from the filter holder 26*s* in a state in which the filter holder 26*s* is detached from the developing device 26. At this time, since the filter holder 26*s* lacks one sidewall as described above, an operation of attaching or detaching the filter 26*t* to or from the filter holder 26*s* can be easily performed in a state in which the filter holder 26*s* is detached from the developing device 26.

As illustrated in FIG. 4B, the filter holder 26*s* is provided with rotary stoppers 26*r* each serving as a stopper which is movable between a regulation position (i.e., the position illustrated in FIG. 4B) at which the rotary stopper 26*r* prevents the filter 26*t* from coming off and a regulation release position at which the filter 26*t* can be removed. Specifically, the rotary stoppers 26*r* as the stoppers are disposed on the upper surfaces of the two sidewalls 26*s*3 and 26*s*4 at both ends in the longitudinal direction to be rotatable around respective support shafts 26*r*1. When each rotary stopper 26*r* is rotated to the position (regulation position) illustrated in FIG. 4B, the filter 26*t* contacts the rotary stoppers 26*r* and is prevented from falling off from the filter holder 26*s*. In contrast, when each rotary stopper 26*r* is rotated by 90° or more in the clockwise direction (or counterclockwise direction) around the support shaft from the regulation position illustrated in FIG. 4B (when each rotary stopper 26*r* is moved to the regulation release position), the filter 26*t* can be taken out from the filter holder 26*s* without contact the rotary stoppers 26*r*. Such a configuration can prevent the filter 26*t* from coming off from the filter holder 26*s* during the operation of the developing device 26. The filter 26*t* can be detached from the filter holder 26*s* as described above with reference to FIG. 6B.

As illustrated in FIGS. 4B and 7A, the developing device 26 according to the present embodiment is provided with screws 90 serving as restrictors that restrict the filter holder 26*s* from coming off from the opening portion 26*k*1 to the outside of the developing device 26. Specifically, the filter holder 26*s* has protruding portions (formed with screw holes) protruding outward in the longitudinal direction at upper portions of the two sidewalls 26*s*3 and 26*s*4 at both ends in the longitudinal direction. On the other hand, the upper developing case 26*k* has female screw portions in portions on which the protruding portions of the sidewalls 26*s*3 and 26*s*4 are placed. The screws 90 are screwed into the female screw portions of the upper developing case 26*k* via the protruding portions (screw holes) such that the filter holder 26*s* is fixed to the upper developing case 26*k*. When the filter holder 26*s* is removed together with the filter 261 from the developing device 26 (upper developing case 26*k*), the screws 90 are disengaged as illustrated in FIG. 7A. In the present embodiment, the filter holder 26*s* is fixed to the upper developing case 26*k* by screw fastening. A way of fixing the filter holder 26*s* to the upper developing case 26*k* is not limited thereto, and the filter holder 26*s* may be fixed by, for example, snap-fastening.

Figure 8:
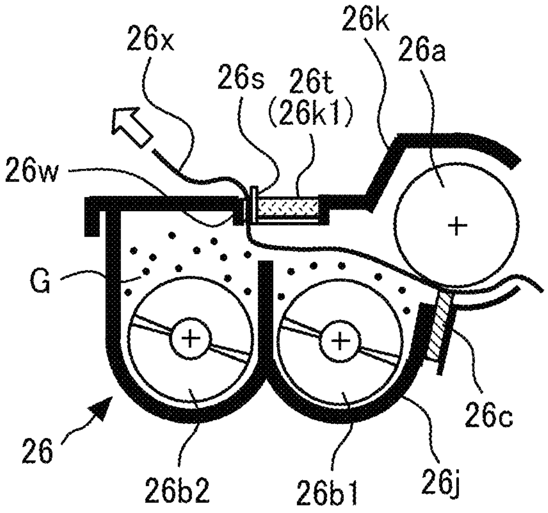
FIG. 8 is a schematic view of a new developing device at the time of shipment from a factory.

As illustrated in FIG. 8, a sheet-shaped member 26*x* is removably disposed in the developing device 26 in the present embodiment. The sheet-shaped member 26*x* separates the inside of the developing device 26 in a manner such that a closed space that stores the developer G is formed in the developing device 26 to prevent the developer G (i.e., preset developer packed in advance at the time of shipment) contained in the developing device 26 from leaking to the outside until use of the developing device 26 is started in the body of the image forming apparatus 1. The sheet-shaped member 26*x* is disposed in a manner such that one end of the sheet-shaped member 26*x* is exposed to the outside of the developing device 26 from the inside of the developing device 26 through a clearance between the opening portion 26*k*1 and the filter holder 26*s* (i.e., a space between the seal 26*w* attached to the opening portion 26*k*1 and the sidewall 26*s*2). When a user starts using the developing device 26 in the body of the image forming apparatus 1, a portion of the sheet-shaped member 26*x* exposed to the outside of the developing device 26 is gripped, and the sheet-shaped member 26*x* is pulled out from the inside of the developing device 26.

Specifically, the sheet-shaped member 26*x* is made of a transparent plastic material such as an overhead projector (OHP) transparency sheet or Mylar (DuPont. Inc) having a thickness of approximately 0.1 to 0.5 mm and has a substantially rectangular shape to extend in the pull-out direction (i.e., the direction indicated by the white arrow in FIG. 8). The width of the sheet-shaped member 26*x* is set in accordance with the range in a width direction of the inside of the developing device 26. The inside of the developing device 26 can be isolated with the sheet-shaped member 26*x*, and a portion of the sheet-shaped member 26*x* exposed to the outside of the developing device 26 is set sufficiently long.

A new developing device 26 (including a recycled product) is shipped from a factory in a state in which the sheet-shaped member 26*x* is disposed as illustrated in FIG. 8. That is, after the developer G is filled into the inside (i.e., a first conveyance passage B1 and a second conveyance passage B2) of the developing device 26 in a state where assembly is completed, the sheet-shaped member 26*x* is disposed to block between the first conveyance passage B1 and the developing roller 26*a* so that the developer G does not leak to the outside of the developing device 26. With reference to FIG. 8, the sheet-shaped member 26*x* in the present embodiment covers the entire region in the longitudinal direction between the projecting end of the doctor blade 26*c* and the left edge of the opening portion 26*k*1 inside the developing device 26. The vicinity of one end of the sheet-shaped member 26*x* near the doctor blade 26*c* is bonded (or thermally welded) to the developing device 26 (in the present embodiment, the projecting end of the doctor blade 26*c*) with a relatively light force. The vicinity of the other end of the sheet-shaped member 26*x* is nipped between the filter holder 26*s* and the opening portion 26*k*1 (or the seal 26*w*). Thus, a tensile force is applied to the sheet-shaped member 26*x*. As a result, the developer G is prevented from leaking toward the developing roller 26*a*.

As described above, in the present embodiment, an opening for exposing one end of the sheet-shaped member 26*x* to the outside of the developing device 26 is not formed as a dedicated opening, but the opening portion 26*k*1 for the filter 26*t* is also used as the opening. Accordingly, the configuration of the developing device 26 can be simplified. Since the opening portion 26*k*1 is relatively large, the sheet-shaped member 26*x* can be easily installed in the developing device 26 at the time of manufacture. The sheet-shaped member 26*x* is in contact with an edge (i.e., left edge in FIG. 8) via the seal 26*w* on a side where a closed space is to be formed in the opening portion 26*k*1 of the upper developing case 26*k*. Accordingly, the sealing property of the closed space formed in the developing device 26 can be enhanced. When the sheet-shaped member 26*x* is pulled out at the start of use of the developing device 26, the sheet-shaped member 26*x* is in sliding contact with the seal 26*w*, so that the toner adhering to the sheet-shaped member 26*x* is cleaned. As a result, hands of the user who performs the operation of pulling out the sheet-shaped member 26*x* are less likely to be dirty.

First Modification

Figure 9:
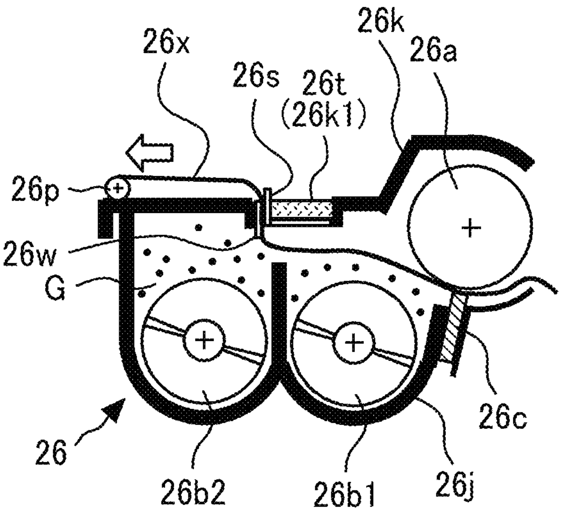
FIG. 9 is a schematic view of a new developing device at the time of shipment from a factory as a first modification.

As illustrated in FIG. 9, the new developing device 26 according to a first modification is also provided with a sheet-shaped member 26*x* for forming a closed space for storing preset developer G, similarly to the developing device 26 in FIG. 8. The developing device 26 according to the first modification is provided with a winding shaft 26*p* that is rotatable on an upper surface of the upper developing case 26*k*. An end (a portion exposed to the outside of the developing device 26) of the sheet-shaped member 26*x* is fixed to the winding shaft 26*p* by, for example, adhesion so that the sheet-shaped member 26*x* can be wound around an outer circumferential surface of the winding shaft 26*p* by rotation of the winding shaft 26*p*. As illustrated in FIG. 9, the developing device 26 having a such configuration is attached to the body of the image forming apparatus 1 in a state in which the developer G contained inside the developing device 26 is enclosed and sealed by the sheet-shaped member 26*x*. Such cases are as follows: (a) the case where the new image forming apparatus 1 in which the new developing device 26 has been installed is shipped, and (b) the case where a new developing device 26 for replacement is installed in the body of the image forming apparatus 1 already used by a user. In any of the above-described cases, before the use (developing process) of the new developing device 26 in the body of the image forming apparatus 1 is started, the winding shaft 26*p* is rotated by a drive mechanism, so that the sheet-shaped member 26*x* in the enclosed and sealed state is wound by the winding shaft 26*p*. That is, as illustrated in FIG. 9, before the image forming operation (developing step) is started in a state in which the developing device 26 provided with the sheet-shaped member 26*x* in a hermetically sealed state is mounted in the body of the image forming apparatus 1, the winding shaft 26*p* is driven to rotate, so that the sheet-shaped member 26*x* is moved in a direction indicated by the white arrow and wound by the winding shaft 26*p*. Thus, a normal image forming process (developing process) is performed in the state illustrated in FIG. 2. Also in the first modification, the filter holder 26*s* is attachable to and detachable from the upper developing case 26*k* with the filter 26*t* held by the filter holder 26*s*. Such a configuration causes air to smoothly flow from the inside of the developing device 26 to the outside of the developing device 26 of the filter 26*t* and reduce scattering of the toner T collected by the filter 26*t* when the filter 26*t* is detached from the developing device 26.

Second Modification

Figure 10:
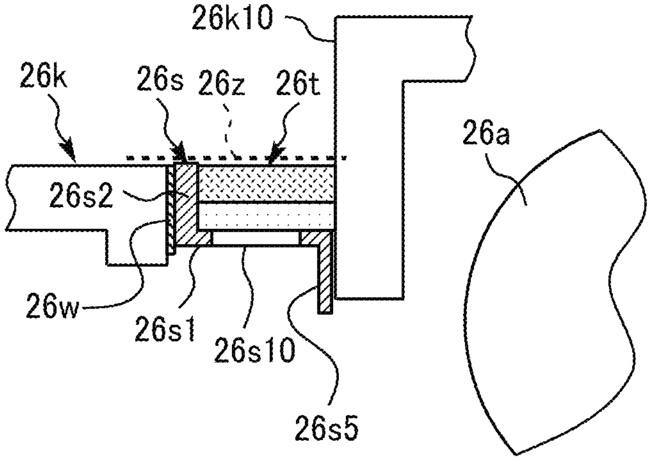
FIG. 10 is an enlarged cross-sectional view illustrating a state in which a filter holder is disposed in an opening portion of a developing device together with a filter according to a second modification.

As illustrated in FIG. 10, in the developing device 26 according to a second modification, the filter holder 26*s* is provided with a standing wall 26*s*5 that stands toward the inside of the developing device 26 (downward in FIG. 10) from one side (one side facing the opposing wall 26*k*10) on which the three sidewalls 26*s*2 to 26*s*4 are not formed among the four sides of the bottom. That is, as illustrated in FIG. 10, the filter holder 26*s* has a crank shape (substantially S-shape) when viewed in a cross section orthogonal to the longitudinal direction. The standing wall 26*s*5 disposed in this manner can reduce a warp of the filter holder 26*s* in the longitudinal direction of the developing device 26. As a result, the filter 26*t* is held by the filter holder 26*s* in a straight state. Thus, the filter 26*t* functions normally. As illustrated in FIG. 10, the developing device 26 according to the second modification is provided with a pressing member 26*z* (in which a hole for ventilation is formed) serving as a restrictor instead of the screw 90. The pressing member 26*z* that presses the filter holder 26*s* together with the filter 26*t* from above is detachably attached to the upper developing case 26*k* that restricts the filter holder 26*s* from coming off from the opening portion 26*k*1 to the outside of the developing device 26 by snap-fastening. Further, as illustrated in FIG. 10, the developing device 26 according to the second modification is formed in a manner such that the opposing wall 26*k*10 of the upper developing case 26*k* extends to a position sufficiently higher (above) than the upper surfaces of the filter holder 26*s* and the filter 26*t*. Also in the second modification, the filter holder 26*s* is attachable to and detachable from the upper developing case 26*k* with the filter 26*t* held by the filter holder 26*s*. Such a configuration causes air to smoothly flow from the inside of the developing device 26 to the outside of the developing device 26 of the filter 26*t* and reduce scattering of the toner T collected by the filter 26*t* when the filter 26*t* is detached from the developing device 26.

Third Modification

Figure 11:
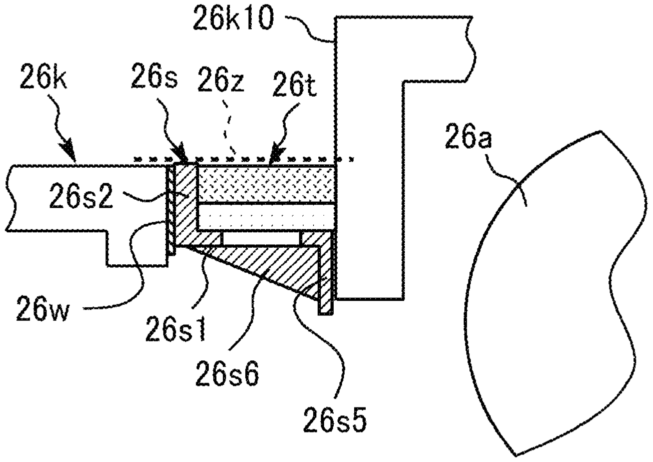
FIG. 11 is an enlarged cross-sectional view illustrating a state in which a filter holder is disposed in an opening portion of a developing device together with a filter according to a third modification.

As illustrated in FIG. 11, the filter holder 26*s* in a third modification is also provided with the standing wall 26*s*5 that stands toward the inside of the developing device 26 from one side on which the three sidewalls 26*s*2 to 26*s*4 are not formed among the four sides of the bottom 26*s*1 similarly to the filter holder 26*s* in second modification. As illustrated in FIG. 11, the filter holder 26*s* according to the third modification has at least one rib 26*s*6 connected to the bottom 26*s*1 and the standing wall 26*s*5 on the inside of the developing device 26. The rib 26*s*6 disposed in this manner further reduces a warp of the filter holder 26*s* in the longitudinal direction of the developing device 26.

As described above, the developing device 26 in the present embodiment stores the developer inside and develops a latent image formed on the surface of the photoconductor drum 21 (image bearer). The developing device 26 has the upper developing case 26*k* formed with the opening portion 26*k*1 as a communication port between the inside and the outside of the developing device 26. Further, the filter holder 26*s* holding the filter 26*t* is disposed in the opening portion 26*k*1. The filter 26*t* is formed in a manner such that the weight density per unit volume on the first side (facing the inside of the developing device 26) of the filter 26*t* is smaller than the weight density per unit volume on the second side (facing the outside of the developing device 26) of the filter 26*t*. The filter holder 26*s* is attachable to and detachable from the upper developing case 26*k* with the filter 26*t* held by the filter holder 26*s*. Such a configuration causes air to smoothly flow from the inside of the developing device 26 to the outside of the developing device 26 of the filter 26*t* and reduce scattering of the toner T collected by the filter 26*t* when the filter 26*t* is detached from the developing device 26.

In the present embodiment, the process cartridge 20 does not include the developing device 26. The developing device 26 is a unit that is independently attachable to and removable from the body of the image forming apparatus 1. Alternatively, the developing device 26 may be one of the constituent elements of the process cartridge 20. In this case, the process cartridge 20 including the developing device 26 as an integral part is attachable to and removable from the body of the image forming apparatus 1. In such a configuration, similar effects to those of the present embodiment are also attained. It is to be noted that the term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the body of the image forming apparatus.

In the present embodiment, the developing device 26 includes the two conveying screws (i.e., the first conveying screw 26*b*1 and the second conveying screw 26*b*2) as the conveyors horizontally arranged in parallel and the doctor blade 26*c* disposed below the developing roller 26*a*. The configuration of the developing device is not limited to the above-described configuration. In the developing device according to one or more embodiments of the present disclosure, three or more conveyors may be horizontally arranged in parallel, multiple conveyors may be arranged in parallel in the vertical direction, or the doctor blade may be disposed above the developing roller. In the present embodiment, the developing device 26 stores the two-component developer including toner and carrier. Alternatively, according to one or more embodiments of the present disclosure, the developing device may store one-component developer (i.e., toner, which may include additives). In this case, the developing roller may be disposed in contact with the photoconductor drum (image bearer) in the developing device. Such a case can also provide similar effects to those of the present embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A developing device comprising:

a developing case to store developer inside to develop a latent image formed on a surface of an image bearer, the developing case including an opening portion that communicates between an inside and an outside of the developing device;

a filter including a lower weight density per unit volume at a first side of the filter facing the inside of the developing device than a weight density per unit volume at a second side of the filter facing the outside of the developing device; and a filter holder detachably attached to the opening portion of the developing case with the filter held by the filter holder, wherein:

the filter holder includes a bottom located inside the developing device and a sidewall standing from a side of the bottom toward the outside of the developing device, the bottom including a plurality of through-holes, the developing case includes an opposing wall facing the sidewall, the opposing wall being part of an edge of the opening portion, the filter is held and compressed by the sidewall and the opposing wall, and the filter holder includes a standing wall that stands from the bottom toward the inside of the developing device.

2. The developing device according to claim 1, wherein the filter holder includes three sidewalls standing from three of four sides of the bottom toward the outside of the developing device, the bottom including a rectangular parallelepiped shape, and wherein the filter is held and compressed by the three sidewalls and the opposing wall.

3. The developing device according to claim 2, further comprising a developing roller disposed to face or contact the image bearer, wherein the filter holder is disposed to face the developing roller via the opposing wall.

4. The developing device according to claim 2, wherein:

the standing wall stands from one side of the four sides of the bottom toward the inside of the developing device, the one side being a side on which the three sidewalls are not formed among the four sides of the bottom.

5. The developing device according to claim 4, wherein the filter holder has a rib that connects with the bottom and the standing wall inside the developing device.

6. The developing device according to claim 2, wherein the developing case includes a seal that seals a clearance between the opening portion and the three sidewalls of the filter holder.

7. The developing device according to claim 1, wherein the filter holder includes a stopper that is movable between a regulation position at which the stopper prevents the filter from coming off and a regulation release position at which the filter is removable.

8. The developing device according to claim 1, further comprising:

a sheet removably disposed in the developing device to separate the inside of the developing device to form a closed space in which the developer is stored in the developing device, wherein the sheet is disposed in the developing device in a manner such that one end of the sheet exposes from the inside of the developing device to the outside of the developing device through a clearance between the opening portion and the filter holder.

9. The developing device according to claim 1, further comprising a restrictor that restricts the filter holder from coming off from the opening portion to the outside of the developing device.

10. A process cartridge comprising:

the developing device according to claim 1; and the image bearer integrated with the developing device, wherein the process cartridge is attachable to and detachable from a body of an image forming apparatus.

11. An image forming apparatus comprising the developing device according to claim 1.

* * * * *